United States Patent [19]
Bliss et al.

[11] Patent Number: 5,687,217
[45] Date of Patent: Nov. 11, 1997

[54] LISTEN VERIFICATION METHOD AND SYSTEM FOR CELLULAR PHONES

[75] Inventors: Gary L. Bliss, Westminster; Bryan Edwards, Boulder, both of Colo.

[73] Assignee: SpectraLink Corporation, Boulder, Colo.

[21] Appl. No.: 418,490

[22] Filed: Apr. 7, 1995

[51] Int. Cl.[6] .................................................... H04Q 7/22
[52] U.S. Cl. ............................. 379/59; 455/67.1; 379/34
[58] Field of Search ........................... 379/1, 2, 32, 33, 379/34, 58, 59, 63, 27, 29; 455/33.1, 56.1, 67.1, 67.3, 67.4, 67.7, 8, 9, 115

[56] References Cited

U.S. PATENT DOCUMENTS

| | | | |
|---|---|---|---|
| 5,095,500 | 3/1992 | Tayloe et al. | 379/32 |
| 5,297,193 | 3/1994 | Bouix et al. | 379/32 X |
| 5,327,575 | 7/1994 | Menich et al. | 455/33.1 X |
| 5,363,376 | 11/1994 | Chuang et al. | 379/58 X |
| 5,425,076 | 6/1995 | Knippelmier | 379/59 X |
| 5,463,673 | 10/1995 | Herscovici | 379/59 |
| 5,471,649 | 11/1995 | Rees et al. | 455/67.4 |
| 5,490,204 | 2/1996 | Gulledge | 379/59 |

*Primary Examiner*—Dwayne Bost
*Assistant Examiner*—William G. Trost
*Attorney, Agent, or Firm*—Dorr, Carson, Sloan & Birney, P.C.

[57] ABSTRACT

A method and system for verifying that each remote cell unit in a cellular phone system is operational. The system and method in accordance with the present invention use the receiver equipment of each cell unit to listen to or monitor transmissions by other cell units. Each cell unit is independently placed in a listen verification mode in which it measures communication quality of other cell units that it can hear. The selected cell unit reports the communication quality results to a master control unit. The master control unit stores the result information to allow a comparison of communication quality over time. If communication quality has degraded over time by a significant amount, the master control unit signals an alarm. In another aspect of the present invention, the listen verification mode can be used during installation of the cellular system to verify performance of the system and adjust the system for optimal performance.

19 Claims, 6 Drawing Sheets

LISTEN VERIFICATION METHOD AND SYSTEM FOR CELLULAR PHONES

BACKGROUND OF THE INVENTION

The present invention relates in general, to cellular phone systems, and more particularly, to a method for determining communication quality provided by base stations in an indoor cellular system.

1. Statement of the Problem

Cellular phone systems are made up of a plurality of spatially distributed base stations or "remote cell units" (RCUs) that are essentially radio transmitters and receivers. The space surrounding each cell unit in which the cell unit's signal strength is sufficiently strong in relation to noise and interfering signals is called a "cell." Each cell unit transmits and receives on a given set of frequencies and communicates with one or more mobile telephones while the mobile phones are located within the cell boundaries.

Each cell unit is coupled to a master control unit that coordinates activities and telephone traffic among the various cell units in the system. The master control unit directs calls to a public telephone network. The mobile phone and the cell unit use a common protocol that defines parameters such as signal format, timing, and operating frequencies to allow communication between the cell unit and the mobile phone.

In an outdoor cellular environment, each cell unit covers a large area (i.e., one or more miles). Also, in an outdoor cellular environment the signal strength distribution is relatively "well behaved", that is to say, signal strength deteriorates predictably as the mobile phone moves away from the cell unit and increases predictably as the mobile phone moves towards the next cell unit. This allows the shape of the cell boundaries to be determined with some certainty, easing installation and maintenance.

Although the indoor cellular environment is generally organized in a similar way (i.e., a plurality of cells each supporting communication links in a predetermined amount of space in the cellular system) the signal strength distribution is much less well behaved than in the outdoor cellular environment. In the indoor environment, cells are placed much closer together and may or may not be uniformly positioned throughout the system. Thus, predicting the location of cell boundaries is a significant problem in the indoor environment.

A cell unit's broadcast range may be unpredictably effected by duct work, piping, or other building features so that a particular cell unit's signal may be very much stronger or weaker than expected at various locations. Also, in an indoor cellular environment, traffic density varies considerably from one physical location to another. This is because some areas, such as office areas and hallways, may have a consistently high demand for phone usage while other areas, such as restrooms or storage areas, have a consistently low demand for calls. These factors make it difficult to install the cellular system so as to optimize the call quality and meet the customer capacity demand. In the past, installation required using dedicated equipment to monitor the signal strength and signal quality at various locations throughout the indoor cellular system. This information was used to place and size the cell units. A need exists for an inexpensive means to monitor communication quality during installation of an indoor cellular system.

Cells in an indoor cellular environment overlap to compensate for the shadow regions or to provide increased traffic capacity for busy areas such as hallways or office areas. Cells overlap when more than one cell unit can serve a mobile telephones at a given physical location. Because of this cell overlap, some cell units can fall within the cell boundaries of neighboring cell units. This degree of overlap is uncommon in outdoor cellular environment. One difficulty caused by the overlap is that if a cell unit fails, the system continues to operate by servicing mobile phones with neighboring cell units. However, the traffic capacity and call quality are degraded by the failed cell unit. It is difficult to identify whether the degraded system performance is caused by a broken mobile telephone, a failed cell unit, or some other cause. This results in dissatisfied customers who believe their mobile telephone has failed when in fact it is the cell unit that has failed. Some means for determining if a cell unit is functioning properly is needed.

What is needed is a method and system for automatically determining whether a cell unit is operational and preferably to automatically monitor the communication quality provided by the cell unit.

2. Solution to the Problem

These and other problems are solved by a method and system for determining if a cell unit is operational and detecting changes in communication quality provided by a cell unit. Information is gathered about the functionality and communication quality provided by cell units in a cellular system. This information is preferably gathered by the cell units and stored. The information is periodically gathered to allow comparison of functionality and communication quality over an extended period of time. Also, the information can be gathered on demand in response to complaints by system users of poor communication quality. During installation of the cellular system, the method and system provide information that is helpful in proper and efficient placement of cell units. During continued operation of the cellular system, the method and system provide continuing diagnostic information to ensure continued functionality and communication quality.

SUMMARY OF THE INVENTION

The present invention provides a method and system for verifying that each remote cell unit in a cellular phone system is operational. The system and method in accordance with the present invention use the receiver equipment of each cell unit to listen to or monitor transmissions by other cell units. Each cell unit is independently placed in a listen verification mode in which it measures communication quality of other cell units that it can hear. The selected cell unit reports the communication quality results to a master control unit. The master control unit stores the result information to allow a comparison of communication quality over time. If communication quality has degraded over time by a significant amount, the master control unit signals an alarm. In another aspect of the present invention, the listen verification mode can be used during installation of the cellular system to verify performance of the system and adjust the system for optimal performance.

DETAILED DESCRIPTION OF THE DRAWINGS

1. Overview

Figure 1:
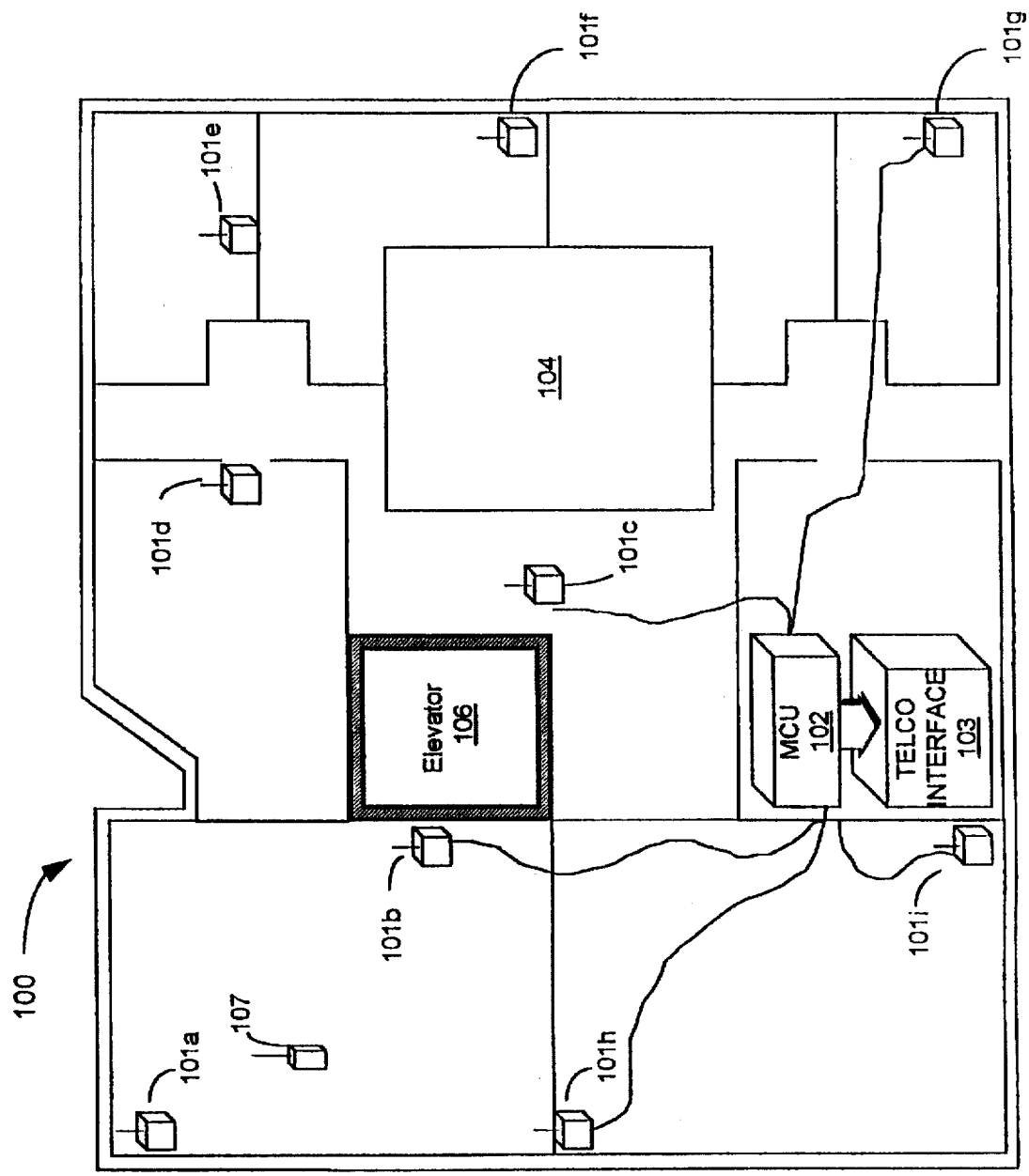
FIG. 1 illustrates a simplified indoor cellular telephone environment.

Digital communications systems code analog data and control data into some coding format that is recognized by both the system transmitters and receivers. Each communication system is allocated a limited number of frequencies or channels. A fundamental purpose of the coding format is to allow as many users to simultaneously access (or appear to a simultaneously access) the system using the limited number of channels. In cellular phone systems each user also requires the coding format to provide two way (i.e., forward and return) communication.

Digital coding formats that support multiple users are called "multiple access". Two-way communication systems are called "duplex". The digital coding format serves to multiplex the forward and return radio signals from multiple users onto the limited number of channels allocated to the system. The coding format divides the limited number of channels in to pieces and then allocates the pieces to the forward and return portions of the different users conversations.

Frequency division describes coding formats in which the system communications are divided among multiple radio frequencies. Where each conversation is carried over a separate frequency, the system is called frequency division multiple access (FDMA). Where forward conversations are carried on a first frequency and return conversations are carried on a second frequency the system is called frequency division duplex (FDD).

Time division describes coding formats in which a single channel is allocated to a particular communication for a fixed amount of time, then the channel is freed for other communications. Time division multiple access (TDMA) allocates a unique time portion or time slot of a single channel to each conversation of multiple concurrent conversations, creating the appearance that each user has complete use of the single channel. Where the channel is allocated so that forward conversations occur in one time slot and return communication in another time slot, the system is called time division duplex (TDD).

In addition to time division and frequency division, communications can be divided and multiplexed onto a limited number of frequencies by coding each communication with a unique key. By providing the transmitters and receivers with the unique key, multiple users can simultaneously access the limited number of channels. This system is known as code division multiple access (CDMA).

In practice, digital communication systems take advantage of several of these coding formats. For example, a TDMA/FDD system can serve multiple users using a time division format while providing duplex operation using multiple frequencies. Code division may be used in combination with either time division or frequency division. The present invention is described in terms of a time division multiple access (TDMA) system and in particular a TDMA system using time division duplex (TDD). The example system is also a frequency-hopping spread spectrum system which means that multiple frequencies are used to carry the TDMA/TDD signal. In view of the great flexibility in the digital coding arrangements to be expressly understood that the present invention is applicable to any type of digital coding format and is not to be limited to the TDMA/TDD format of the illustrative embodiment.

The communication quality provided by a cell unit is largely a function of signal strength received at a the location of a mobile phone trying to use the cell unit. Another signal quality measurement used in digital cellular systems is bit error rate. Still another signal quality measurement is the ease with which the mobile phone synchronizes with the cell unit. Signal strength and bit error rate, and synchronization performance alone or in combination, are referred to herein as "communication quality" measurements. Other signal quality measurements that are similar to these are known and may be used in accordance with the present invention.

FIG. 1 illustrates a highly simplified digital indoor cellular system installed in an office building. By digital it is meant that the audio and control signals passing between the mobile phones 107 and cell units 101a–101i are digitally encoded. In a particular example, the method of the present invention is implemented in a digital cellular system using time division multiple access (TDMA). The teachings of the present invention may be applied to frequency division multiple access (FDMA) at somewhat greater system complexity as will be understood by those skilled in the radio communication field.

For ease of illustration, FIG. 1 does not illustrate plumbing, duct work, wiring, and the like that significantly effect the indoor environment. In other words, the office building illustrated in FIG. 1 greatly simplifies the indoor cellular environment. Notably, remote cell units 101a–101i are not uniformly distributed throughout the system. A higher concentration is shown by cell units 101c, 101d, 101i, and 101f than, for example in the vicinity of cell unit 101g. Cell units 101c–101f are located near a hallway and office complex 104, requiring a higher traffic capacity and therefore closer spacing. Cell units 101b and 101c are relatively close together because their signals are attenuated by elevator 106.

A key feature of the indoor environment is that mobile telephones (not shown) are served by any of a number of cell units 101a–101i. Usually the cell boundaries overlap so that at any physical location in the system, two or more cell units 101a–101i can provide adequate service. For example, mobile phone 107 can communicate with any of cell units 101a, 101b, or 101h. In contrast, a mobile phone near cell 101g would only be able to communicate with cell unit 101g. The particular cell unit that is servicing a particular mobile phone at any given time is determined so as to maximize the overall audio quality provided by the cellular system.

An important feature of the present invention is that cellular system 100 has sufficient overlap that at least some of remote cell units 101a–101i can receive signals or "hear" other of cell units 101a–101i. In the example shown in FIG. 1, remote cell unit 101b can hear cell units 101a and 101h. By the term "hear" it is meant that the signal strength or signal quality of the transmission between cell units 101a–101i is above a predetermined threshold level. It should also be understood that usually no single remote cell unit 101a–101i will be able to hear all other remote cell units 101a–101i. This is particularly true in large systems.

Unlike an outdoor cellular system, cell units 101a–101i are also distributed spatially in three dimensions. When the effects of plumbing, wiring, flooring material, and other common features in an office building are considered, it is apparent that it is extremely difficult to predict which of cells 101a–101i has failed or degraded based upon trouble reports from the user of mobile phone 107. An important feature of the present invention is providing a method for verifying the functionality of cell units 101a–101i.

It should be understood that multiple mobile phones such as mobile phone 107 are present in a practical cellular system. For example, up to several hundred mobile phones may be present in a given cellular system. Also, multiple remote cell units similar to cell units 101a–101i are spatially distributed throughout the system. Each of the cell units 101a–101i is coupled to a single master control unit 102. Master control unit 102 synchronizes the activities of the many remote cell units 101a–101i and provides voice and control information to the cell units. Master control unit 102 is coupled to a telephone company interface 103 that is substantially similar to a conventional private branch exchange (PBX). The telephone company interface 103 provides access to conventional telephone company services.

Figure 4:
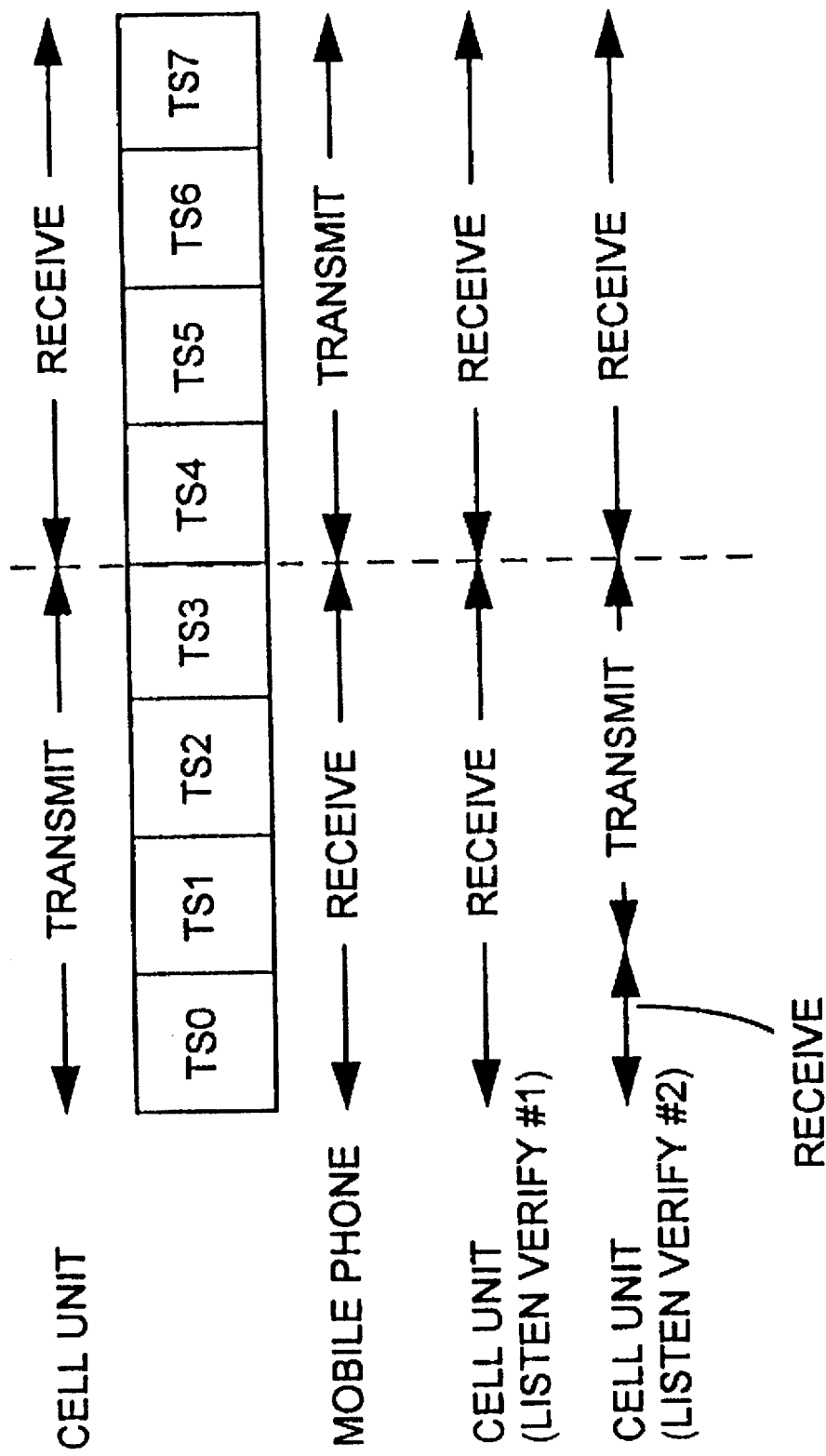
FIG. 4 illustrates a time division multiple access format useful in accordance with the present invention.

In a particular example, cellular system 100 is a frequency hopping system that uses 10 millisecond frames, 8 TDMA time slots to provide 4 duplex conversations, 50 frequencies, and 1 frequency hop per frame (as shown in FIG. 4). Each remote cell unit 101a–101i (shown in FIG. 2) is at a different offset in hopping sequence from every other cell unit 101a–101i so that each RCU 101 can be identified by its relative position in the hopping sequence.

The digital indoor cellular system in accordance with the present invention includes a number of spatially distributed cell units 101a–101i. Cell units 101a–101i are positioned so that at least some of the cell units can hear other cell units during normal operation. Cell units 101a–101i are connected to a master control unit 102 that provides voice and control information to each of RCU's 101a–101i.

In accordance with the present invention, a one cell unit is selected and its resources are directed to listen for other cell units rather than transmitting as is done during normal TDD operation. The selected cell unit gathers information about signal strength, bit error rate, and synchronization performance of the remote cell units that it can hear. This information is gathered periodically or upon request by an operator in response to complaints about system performance.

While a TDD system is used in the preferred embodiment, it should be understood that other communication formats may make use of the present invention, including analog communication systems. Likewise, the cellular system may be fixed frequency or spread spectrum using well known communication techniques. These and other equivalents to the preferred embodiment shown and described are within the scope and spirit of the teachings of the present invention.

2. Remote Cell Unit Design

Figure 2:
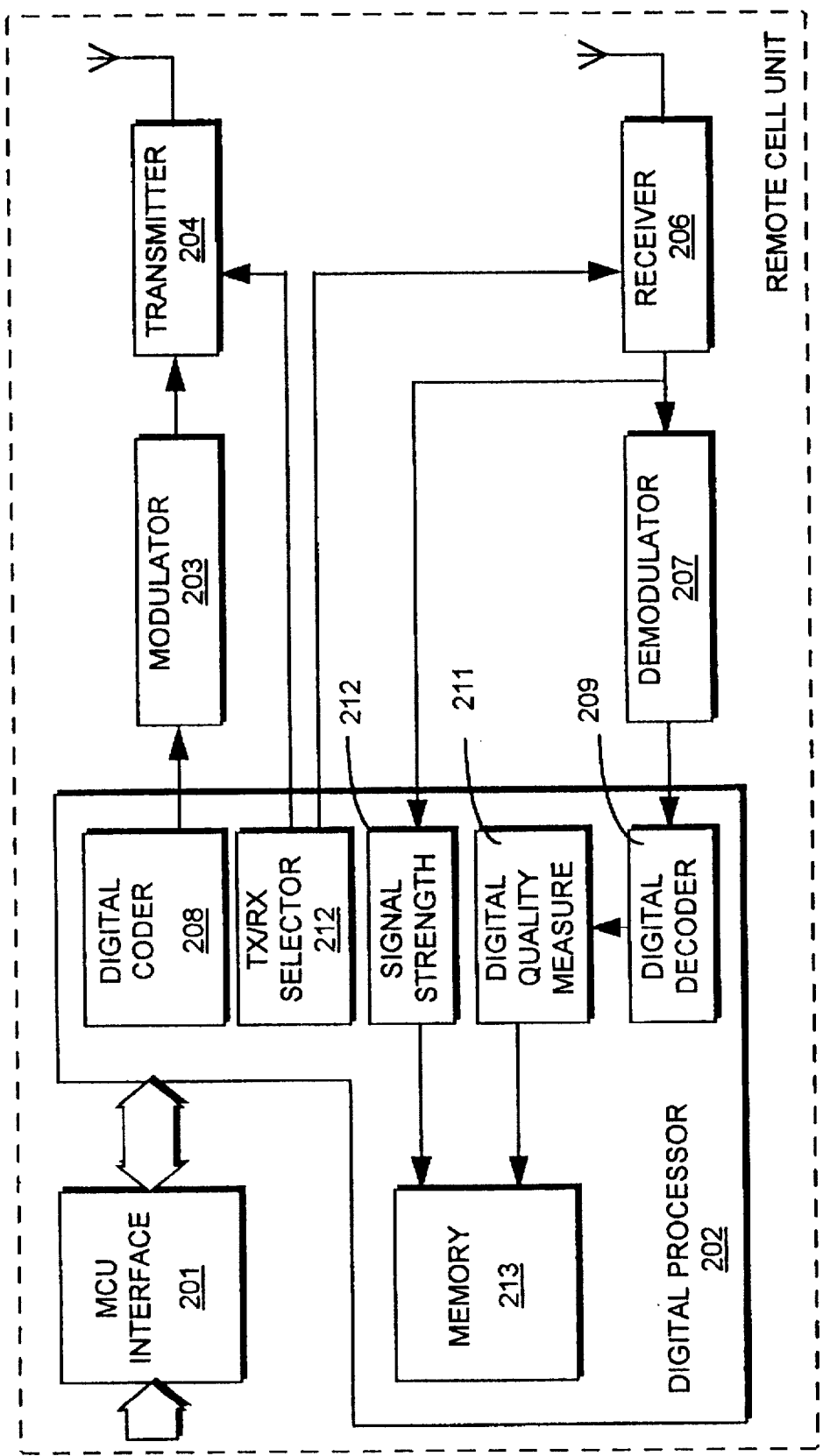
FIG. 2 illustrates in block diagram form basic elements of a remote cell unit shown in FIG. 1.

FIG. 2 illustrates in block diagram form a remote cell unit 101 such as cell units 101a–101i in FIG. 1. It is expressly understood that practical remote cell units will be more complex and incorporate a higher degree of functionality than the simplified block diagram representation shown in FIG. 2. The simplifications in FIG. 2 ease description and understanding of the inventive features of the present invention, and are not intended as a limitation.

Remote cell unit 101 functions to support calls from mobile phones by transmitting and receiving digitally encoded voice and control signals. Remote cell unit 101 is coupled to master control unit 102 via MCU interface 201. MCU interface 201 receives a plurality of voice and data signals from MCU 102 and performs any necessary signal level shifting, data coding translation, demultiplexing, and the like. MCU interface 201 supplies digital voice and control information to digital processor 202.

Digital processor 202 controls functionality of remote cell unit 101 by multiplexing one or more voice channels with one or more control channels to provide a digital signal output. Digital processor 202 includes a digital coder circuit 208 that generates a digital output. As described in greater detail with reference to FIG. 4, the digital output is preferably a TDMA/TDD encoding format. The digital output is coupled to modulator 203. Modulator 203 creates a modulated signal using frequency modulation (FM) in the preferred embodiment. Any well known modulation technique may be used in accordance with the present invention including amplitude modulation (AM), phaseshift keying (PSK) modulation, or the like. Modulator 203 couples the modulated signal to RF transmitter 204 to broadcast the modulated signal throughout the boundaries of cell unit 101.

Remote cell unit 101 also serves to receive incoming transmissions from mobile phones 107. The incoming transmissions from one or more mobile phones 107 are received by receiver 206 and demodulated by demodulator 207. Demodulator 207 provides a digital output from a TDMA/TDD encoded input in the preferred embodiment. Demodulator 207 couples the encoded digital signal to digital decoder circuit 209 within digital processor 202 that decodes the information and provides the decoded information to master control unit 102 (shown in FIG. 1) through MCU interface 201. Detailed construction of digital decoder circuit 209 is well known and any of a number of designs can be used to meet the demands of a particular application.

As used herein, the term "radio frequency" includes signals at any frequency used for wireless communications. Other communication frequencies may also be used with straightforward modifications of the preferred system. In a preferred embodiment, the radio signal is a TDMA/TDD format communication. In such a format, remote cell unit 101 does not transmit and receive at the same time. TX/RX selector circuit 212 serves to enable either transmitter 204 or receiver 206 selectively under control of digital processor 202. In the past, TX/RX selector 212 served only to synchronize the transmit/receive cycles with the cellular system 100. However, in accordance with the present invention, TX/RX selector modifies the traditional TDMA/TDD protocol to allow remote cell unit 101 to emulate a mobile phone such as mobile phone 107 shown in FIG. 1.

Receiver 206 receives a frequency synthesis control signal from digital processor 202 that allows receiver 206 and demodulator 207 to demodulate signals with a variety of carrier frequencies. This allows receiver 206 and demodulator 207 to demodulate each of the frequencies or channels used by cellular system 100 (shown in FIG. 1). The details of frequency hopping TDMA/TDD transmission systems are well known and are not necessary for further understanding of the present invention.

A. COMMUNICATION QUALITY MEASUREMENT.

Communication quality is a measurement of a particular cell unit's ability to maintain a communication link with a mobile phone 107. Communication quality measurement includes instantaneous signal strength measurement, averaged signal strength measurement, bit error rate measurement, and synchronization success rate as described hereinbefore. Other well known measurements that quantify the ability of a communication link to faithfully send and receive data may also be used.

The output of receiver 206 is coupled to signal strength measuring circuit 208 within digital processor 202. Also, digital coder 209 provides a digital data signal to digital quality measurement circuit 211. Digital quality measurement circuit 211 performs bit error rate calculations, parity checks, synchronization checks, etc. to provide an indication of the relative quality of the digital information output from digital decoder 209. Because digital decoder circuit 209 will perform bit synchronization, word synchronization, and error calculations in order to decode the signal from demodulator 207, digital quality measurement circuit 211 may be implemented as a simple memory that tabulates and stores the occurrence of errors detected by digital decoder 209.

A variety of data error detection circuits and protocols are well known and any may be used in decoder circuit 209 and digital quality measurement circuit 211 in accordance with the present invention. Decoder circuit 209 may also correct certain correctable errors and provide a corrected data signal to digital signal processing circuitry (not shown) that is used to process the digital voice data. For purposes of the present invention, digital decoder circuit 209 preferably provides an output to digital quality measure circuit 211 indicating a running count or time averaged count of data errors in the received data.

It should be understood that the various components in FIG. 2 may be integrated or otherwise provided on single circuits with great flexibility. For example, signal strength circuit 208 may be incorporated within a mixed signal integrated circuit or implemented as a discrete component. Digital processor 202 may be a general purpose programmable microcontroller, or may be an application specific integrated circuit, or an assembly of discrete components. Transmitter 204, modulator 203, receiver 206, and demodulator 207 may be integrated in a single component or may be packaged separately.

B. MASTER CONTROL UNIT.

Figure 3:
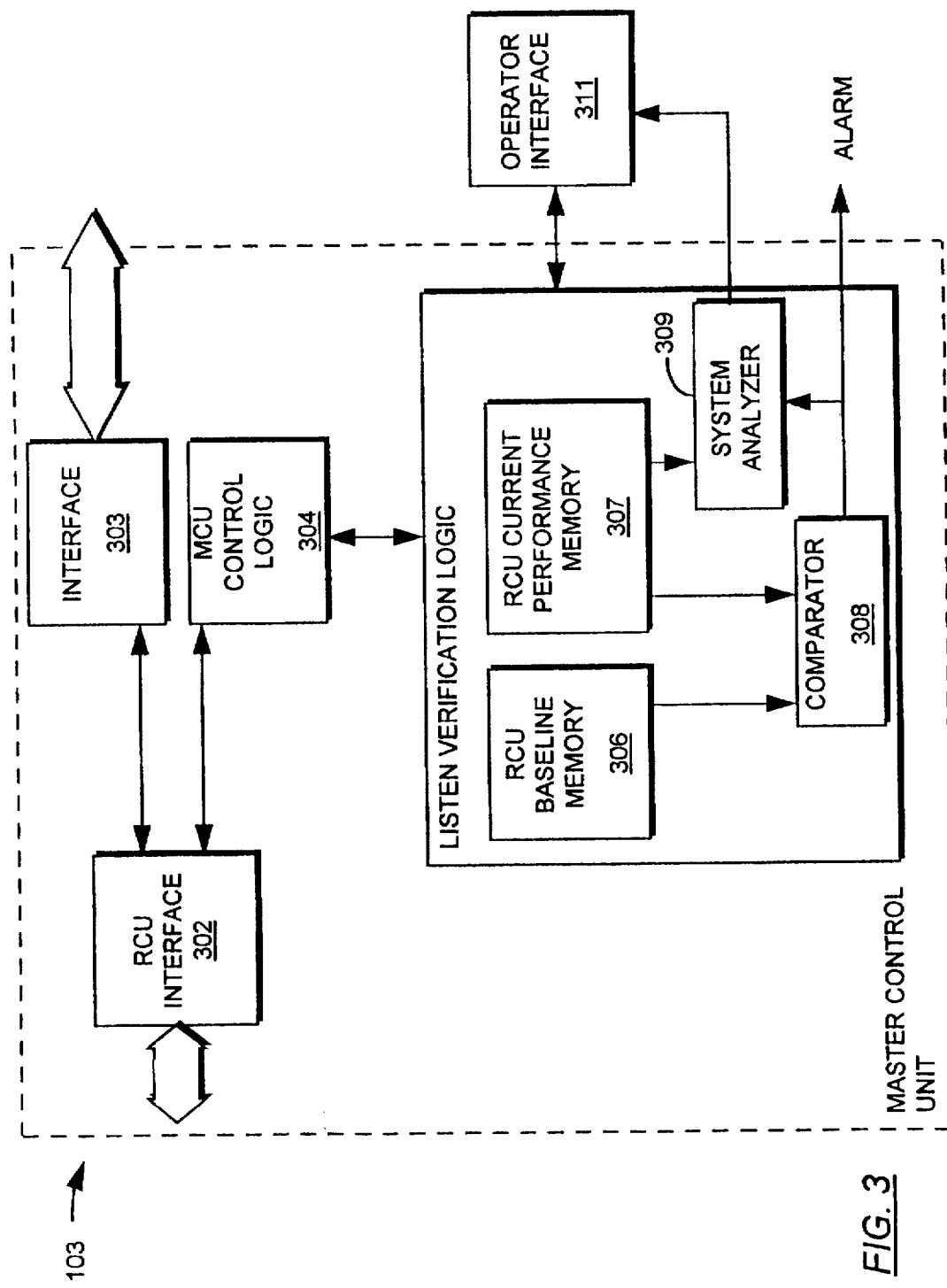
FIG. 3 shows in block diagram form a master control unit in accordance with the present invention.

Master control unit 102 shown in FIG. 3 includes RCU interface 302 for coupling to one or more remote cell units 101a–101i shown in FIG. 1 and FIG. 2. RCU interface 302 provides any necessary signal level translation, multiplexing, demultiplexing, or the like necessary to enable communication between MCU 102 and RCU's 101a–101i. In a particular example, RCU interface 302 is coupled to one or more MCU interface 102 via coaxial cable, fiber optic, twisted pair, or other well known transmission technique.

RCU interface 302 is coupled via interface 303 to the telephone company interface unit 104 shown in FIG. 1. Interface 303 serves to provide necessary signal translation to enable communication between the RCU interface and the telephone company equipment.

Master control unit 102 is driven by MCU control logic 304. MCU control logic 304 serves to coordinate and synchronize all of the remote cell units 101a–101i to which it is coupled. MCU control logic 304 generates control information to instruct each RCU 101 how to perform, directs remote cell units 101a–101i either to establish a call from a mobile phone 107, disconnect a call from mobile phone 107, or to handoff the call from one RCU 101a–101i to another RCU 101a–101i. Control logic 304 also receives status data from the RCU's indicating that calls are completed or ongoing for each RCU 101 in cellular system 100. MCU control logic can be implemented in hardware or as software in a programmable microcontroller or microprocessor. Preferably, MCU control logic, interface 303, and RCU interface 302 are implemented in a programmable general purpose computer, however the particular implementation is determined by the application requirements.

An important feature of the present invention is the listen verification logic 301 implemented in master control unit 102 shown in FIG. 3. Listen verification logic can be implemented in hardware or software using a programmable microcontroller or microprocessor. Preferably, listen verification logic 301 is implemented as software modifications to the code implementing MCU control logic 304. Listen verification logic 301 serves to initiate a listen verification in one or more remote cell units 101a–101i (shown in FIG. 1) either automatically or in response to an input from operator interface 311. Initiation of a listen verification is accomplished in the preferred embodiment by overriding MCU control logic 304 to cause one cell unit 101 to emulate a mobile phone during a time period when the other cell units are acting as normally operating remote cell units 101.

Listen verification logic includes a remote cell unit baseline memory 306 and a remote cell unit current performance memory 307. In accordance with the method of the present invention, remote cell units 101a–101i are instructed to perform a listen verification and report the results back to master control unit 102 via RCU interface 302. During installation of system 100 (shown in FIG. 1) the information returned by each RCU 101a–101i is stored in RCU baseline memory 306. During normal operation, data returned by a listen verification on one or more of remote cell units 101a–101i is stored in RCU current performance memory.

The data stored in memory 306 and memory 307 is essentially a table having an entry for each remote cell unit 101a–101i in cellular system 100. Associated with each remote cell unit (e.g., RCU 101b in FIG. 1) is a list of other cell units 101a–101i that can be heard by the one RCU. For example, RCU 101a and RCU 101h can be heard by RCU 101b in the example of FIG. 1. Hence, the entry in both memory 306 and memory 307 for RCU 101b will include a list of RCU 101a and RCU 101h. Associated with each list entry in memory 306 and memory 307 are one or more statistics related to communication quality as indicated above. For example, in the entry for RCU 101b, the list item of RCU 101a will include signal strength (i.e., −50 dbm), bit error rate (i.e., 10E-6 errors/bit) or synchronization success rate (i.e., bit sync and/or word sync successfully achieved 10 of the last 10 attempts).

Current performance memory 307 stores the response data for one or more recent listen verification operations. Usually the data in memory 307 will vary somewhat from the data in baseline memory 306 due to system aging or environmental changes such as sunspots, RF interference, or moved furniture in the office.

Both baseline memory 306 and current performance memory 307 are coupled to comparator 308. Comparator 308 serves to compare the contents of baseline memory 306 with contents of the current performance memory 307. Comparator 308 generates an alarm when significant differences between memory 306 and memory 307 exist. The term "significant differences" means any difference in performance (either an increase or decrease) that the user determines warrants further attention. When listen verification logic 301 is initialized, it is desirable to provide comparator 308 with some threshold level below which differences will not cause an alarm. Likewise, it is possible to signal more than one type of alarm by providing various threshold levels that are indicative of varying degrees of problems.

Optionally, the output of an alarm by comparator 308 also enables system analyzer 309 to automatically analyze the current performance data to isolate which of RCU's 101a–101i are the cause of the particular problem. System analyzer 309 may also be enabled directly by a signal from the operator interface or other enabling method. System analyzer uses the current performance memory, along with the baseline memory if desired, to isolate a single RCU 101 from the group of RCU's 101a–101i. Referring to FIG. 1, if RCU 101h reports that it can no longer hear RCU 101b, this may be caused by either a bad receiver 206 in RCU 101h or a bad transmitter in RCU 101b. System analyzer 309 accesses current performance memory 307 to determine if RCU 101a can hear RCU 101b. If so, system analyzer 309 determines that transmitter 204 in RCU 101b is operational and that the receiver of RCU 101h must be faulty. It can be appreciated that in a complex system with many cells, a great deal of data is gathered during a listen verification and isolation of failures or system degradation is greatly simplified.

In summary, the master control unit 102 in accordance with the present invention includes listen verification logic for overriding MCU control logic 304 to initiate a listen verification operation. Listen verification logic stores both a baseline result and a current result for each RCU 101a–101i in cellular system 101. It should be understood that some RCUs, such as RCU 101g in FIG. 1, do not hear any other RCU's during normal operation. This only means that RCU 101g will not need to participate in the listen verification because it cannot provide any useful information to listen verification logic 301. Only some of RCUs 101 need to provide listen verification information for the method and system of the present invention to have utility.

Master control unit 102 can be implemented in any programmable electronic device including programmable computers or personal computers. Baseline memory 306 and current performance memory 307 may be any type of memory including RAM, ROM, magnetic, optical, or the like. Current performance memory 307 will be routinely updated, so RAM or magnetic memory are preferable. Master control unit 102 and listen verification logic 301 may be operated automatically, semi-automatically, or under control of an operator. These and other modifications of the particular embodiment disclosed are equivalent implementation in accordance with the present invention.

3. Data Format

The present invention is applicable to any communications format that is continuously able to monitor several remote cell units 101a–101i (shown in FIG. 1). This capability is easily implemented in the TDD format because all the transmitters and receivers in cell units 101a–101i operate in the same frequency range. It is expressly understood that the present invention could be implemented in frequency division multiple access (FDMA) or other digital communication formats with some additional circuit complexity. FIG. 4 illustrates some features of the TDMA/TDD format used in the preferred embodiment.

In FIG. 4, the horizontal line identified as "CELL UNIT" indicates action of a cell unit during normal operation. Similarly, the line identified as "MOBILE PHONE" indicated activity of a mobile phone 107 during normal operation. The two lines identified as "CELL UNIT (LISTEN VERIFY#1) and "CELL UNIT (LISTEN VERIFY #2) indicate action of one RCU 101 of the several RCU's 101a–101i during a listen verification operation.

In TDMA/TDD format, the communication is broken up into frames, one of which is shown in FIG. 4. Each frame has a plurality of time slots, such as time slots TS0–TS7 in FIG. 4. The frames are repeatedly delivered at a predetermined rate. In a duplex system, some of the time slots TS0–TS7 are dedicated to receiving data while other of the time slots are dedicated to transmitting data. In the example of FIG. 4, TS0 through TS3 are used for cell unit 101a–101i transmission and mobile unit 107 reception. Time slots TS4 through TS7 are used for mobile unit 107 transmission and cell unit 101a–101i reception.

Not all of the time slots are used to maintain any given conversation. Typically, each communication link or conversation occupies one transmission slot and one receive slot (i.e., slots TS0 and TS4 in FIG. 4). Hence, eight time slots can support four full duplex conversations simultaneously.

In the preferred system, a total of 50 channels are used by the cellular system to carry on conversations. It should be understood that any number of frequencies may be used depending on the available bandwidth for the system. Fifty frequencies is merely an example. In accordance with the present invention, one selected RCU 101 measures the signal strength of all possible frequencies or channels during a listen verification operation. In the operation illustrated as LISTEN VERIFY#1 in FIG. 4, the selected one RCU measures during all TS0, TS1, TS3 and TS3 when all of the other RCU's 101a–101i are transmitting. The selected RCU 101 can then determine communication quality for each other RCU 101a–101i in the system.

The purpose of this measurement is to use the selected RCU 101 to monitor performance of all other RCU's 101a–101i that can be heard by the selected cell unit 101. Since the selected RCU 101 cannot hear all other RCUs 101a–101i, during system installation, cell units having the signal strength greater than a predetermined threshold (i.e., –60 dbm) are identified and the identities stored in baseline memory 306 (shown in FIG. 3). The particular method to measure communication quality will vary depending on the type of transmission system used (i.e., TDMA, CDMA, etc.) but for any system it is possible to devise a simple way to measure communication quality.

It should be understood that it may take one or more time slots or one or more frames to measure all of the frequencies required. It is possible to measure less than all the frequencies if the selected RCU is provided with information as to which RCU's 101a–101i should be listened to before the listen verification operation begins. In the preferred embodiment, however, the selected RCU 101 listens to all of the frequencies.

As shown by the line identified as listen verify #1 in FIG. 4, all of the normal cell unit transmit time slots may be used for the listen verify operation. It is also acceptable if the listen verify operation take multiple frames (i.e., multiple repetitions of time slots 0–7). The listen verify operation may be repeated more than once with the multiple readings averaged or otherwise statistically combined before they are reported to master control unit 102 and stored in memory 307 or memory 306.

Alternatively, a single time slot may be used such as TS0 shown in FIG. 4 as listen verify #2. When a single time slot per frame is used, calls can continue to be processed on the other time slots such as TS1, TS2 and TS3. However, multiple frames will be required to gather the necessary information, which may cause greater service interruption than would the momentary seizure of all time slots TS1–TS4 to perform the listen verification operation quickly. The particular implementation of and choice of time slots and frequency are design choices that are optimized to meet the performance demands of a particular application.

Any number or configuration of time slots could be provided. It should be understood that the data within each time slot may be formatted in any convenient manner to convey communication, signal and control data between the mobile phone 107 and remote cell units 101a–101i. It is to be expressly understood that the data formatting features of the present invention are not to be limitations on the present invention and are only provided as a particular example.

Also, it is to be expressly understood that a frame may be configured with any number of time slots. Each time slot can have any number of bytes, and can be suitably formatted with any arrangement of digital data necessary for a particular application. The present invention, therefore, is not to be limited to the data format shown in FIG. 4. The drawings herein are for a preferred system embodiment and serve to illustrate the operation of the present invention.

4. Operation of the Present Invention

Figure 5:
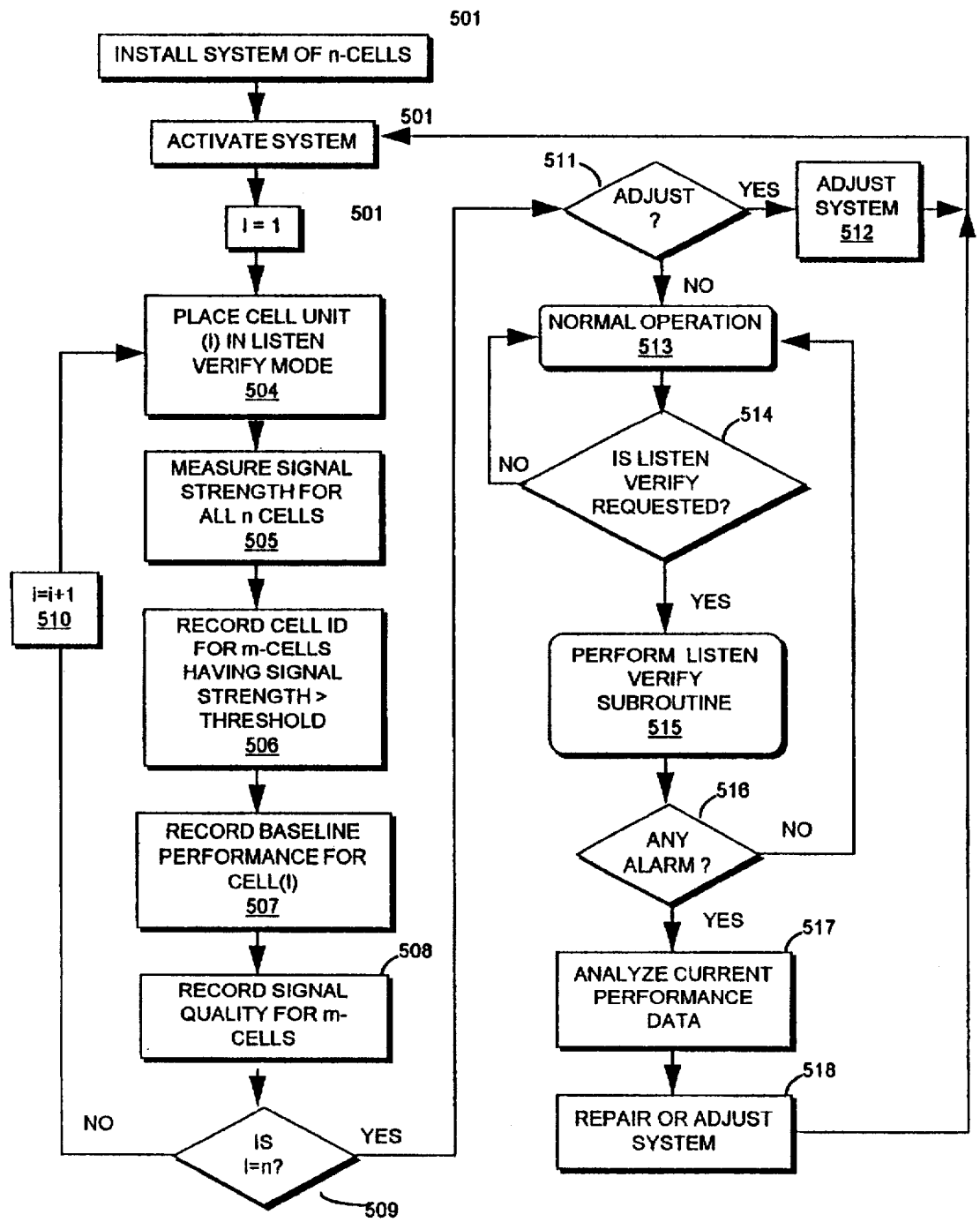
FIG. 5 and FIG. 6 show flow diagrams of the listen verification method in accordance with the present invention.
Figure 6:
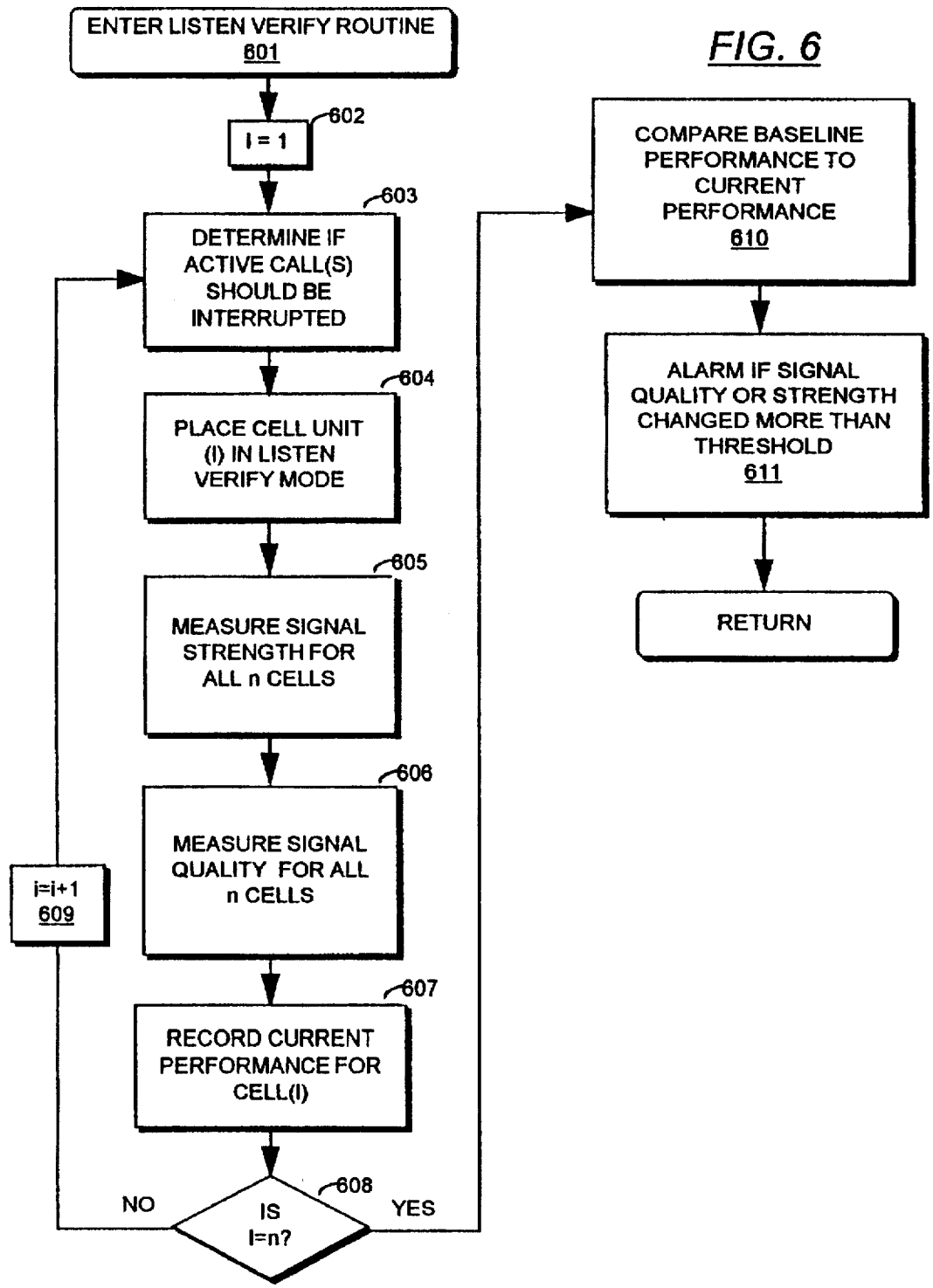

The flow diagrams in FIG. 5 and FIG. 6 illustrate operation of the listen verification method in accordance with the present invention. The functions set out in FIG. 5 and FIG. 6 are easily implemented in a programmable microprocessor, microcontroller, programmable computer, or in similar circuitry. The steps of the present invention are preferably executed in the order presented, but unless specifically stated herein, the steps may be performed in any order. Likewise, at any point in the execution, a subroutine to perform other functions may be entered and execution of the remaining steps of the present invention delayed until such subroutine is completed. It is to be expressly understood that these expedients and design variations considered equivalent to the method in accordance with the present invention.

A. CELLULAR SYSTEM INSTALLATION.

One feature of the present invention is that the listen verification system and method can be used in accordance with the method of the present invention, during installation as shown in FIG. 5. The installation process for a cellular system having n cells begins as step 501 in FIG. 5. The number of cells n is greater than one, but may be tens or hundreds of cells. As set out hereinbefore, each cell is driven by a cell unit 101 placed somewhere in the cellular system 100 shown in FIG. 1.

After installation, cellular system 100 is activated in step 502. Optional steps 504–512 use the listen verification system and apparatus of the present invention to monitor the installation and provide information useful in adjusting the installation before normal operation begins. Steps 513–516 illustrate normal operation in which the cellular system services calls from a plurality of mobile phones 107. Steps 517 and 518 indicate remedial processes performed in accordance with the present invention when problems are detected by the listen verification system and method.

In step 503, a cell counter I is initialized. Together with steps 509 and counter increment step 510, a loop is formed in which steps 504–508 are performed for each of the n cells in cellular system 100. As shown in step 504, one of the n cells is placed in listen verify mode by an instruction from master control unit 102 shown in FIG. 3. Although step 504 could be implemented internal to an RCU 101 based upon a timer or similar initialization scheme, it is recommended that only one cell of the n cells be in listen verify mode at any given time, which requires coordination of all of the n cells that is best implemented by master control unit 102.

The cell that is in listen verify mode measures signal strength for all n cells in step 505. Although not all n cells can be heard in step 505, during installation it is difficult to predict which of the n-cell can be heard. For this reason, step 505 attempts to listen to all cells and records the cell ID for each cell having a signal strength greater than a predetermined threshold in step 506. A subset including m cells will have sufficient signal strength to be heard by the cell in listen verify mode. This subset of cell units is hereinafter referred to as the "m-cell subset". A unique m-cell subset will be associated with each cell unit 101a–101i. The m-cell subset may include any number of cell units, and will include zero cell units in the special case where the selected cell unit 101 is outside the cell boundaries of all other cell units 101a–101i (e.g., cell unit 101g in FIG. 1). The cell ID for each of cell unit in the m-cell subset is recorded by RCU 101 or MCU 102 and associated with the cell that is in listen verify mode. The predetermined threshold may be −60 dbm or −80 dbm, or any other signal level depending on the design of the particular system. For each of the m cells, baseline performance and signal quality are recorded in the baseline memory 306 shown in FIG. 3.

Once all n cells have been operated in the listen verify mode, flow passes from step 509 to adjustment decision step 511. In this step, the baseline performance is analyzed either automatically or manually to determine if any cell units 101a–101i must be moved or adjusted to improve system performance. Until now, installers only had expensive RF field measurement tools to evaluate the system installation or used mobile phones in an attempt to evaluate performance. While these techniques may still be used, the listen verify steps used during installation provide additional information to the installer that can speed installation and adjustment with no increase in equipment expense. If adjustment is needed, flow returns to step 502 where the baseline data is recalculated for all n cells. When adjustment is no longer necessary, normal operation begins in step 513.

B. NORMAL SYSTEM OPERATION.

During normal operation step 513, the remote cell units 101a–101i (shown in FIG. 1) resources are focused on providing service to mobile phones 107. The listen verify operation remains inactive until requested by an automatic timer or system operator. Normal operation is interrupted in step 514 when a listen verify operation is requested, and flow passes to the listen verify subroutine in step 515.

Listen verify step 515, illustrated in detail in FIG. 6, may involve a listen verify performed on only one of remote cell units 101a–101i, or may involve up to all of the cell units 101a–101i. The results of listen verify step 515 will be an alarm of some form if one or more sets of information returned to listen verify logic 301 indicate a significant degradation or failure. Preferably, the alarm triggers an analysis step 517 to isolate which of the cell units 101a–101i have a problem. In step 518, the system is repaired or adjusted, following a return to system activation step 502. Although not illustrated, repair or adjust step 518 may also pass control to normal operation step 513 if it is not necessary to perform the baseline operation steps 503–512 again. This determination is within the discretion of the system operator.

FIG. 6 illustrates a flow diagram of a portion of the method of the present invention responsible for performing the listen verify operation 515 shown in FIG. 5. The steps shown in FIG. 6 are implemented by cooperation of master control unit 102 and remote cell unit 101. The method enters the listen verify routine at step 601 and initializes a cell counter (I in FIG. 6). Steps 602, 608, and 609 together form a loop causing steps 603–607 to be repeated for each of the n cells in cellular system 100. It is expressly understood that if less than all n cells are to be operated in listen verify mode, the flow of FIG. 6 will be modified in well known ways to limit the number of cells processed through listen verification.

In step 603, the system or operator determines if active calls on the cell unit 101 selected for listen verification should be interrupted. As set out in reference to FIG. 4, the listen verification means uses at least one time slot to perform the listen verification, preventing the cell unit from servicing calls. If listen verification begins immediately, ongoing calls may be lost, or may be transferred to neighboring cell units that are not currently in listen verification. It is within the system operator's discretion to decide how polite the listen verification will be. Waiting for a cell to become inactive will take time, but will cause the least disturbance to the system. Once the selected cell unit's time slots are inactive or it is determined to interrupt ongoing calls, the selected cell unit is placed in listen verify mode.

While in listen verify mode, the selected cell unit emulates a mobile phone during the portion of the TDD cycle when cell units 101a–101i are transmitting. The selected cell unit's transmitter 204 is deactivated and its receiver 206 is activated for at least one time slot in which the other cell units 101 are transmitting. During step 605, the signal strength of all n cells is measured by measuring signal strength of all frequencies used in cellular system 100. Alternatively, it is possible to measure only the m-cell subset associated with the currently selected cell. In a spread spectrum system this will require either anticipating which frequencies the m-cell subset is using which will require more data processing and memory storage capability in each RCU 101a–101i.

Communication quality is measured in step 606. It is to be expressly understood that communication quality step 606 and signal strength measurement step 605 may be performed alternatively or together, and that they may be performed serially or simultaneously. These modification of the flow shown in FIG. 6 are considered equivalents to the method of the present invention. Once some form of communication quality measurement is performed, current performance information is transmitted to master control unit 102 and recorded in the current performance memory 307 in step 607.

After all n cells (or whatever subset of the n cells is selected) have been processed through the listen verification routine, a comparison of baseline performance to current performance is made in step 610. Comparison step 610 is implemented in listen verification logic 301 shown in FIG. 3. An alarm is generated in step 611 if any changes are noted during comparison step 608 that are greater than the predetermined threshold level. Whether an alarm is triggered or not, flow returns to the main routine at step 516.

Is should be appreciated that a method and apparatus for verification and analysis of cell functionality in a digital cellular phone system has been provided. It is to be expressly understood that the claimed invention is not to be limited to the description of the preferred embodiment or specific examples but encompasses all modifications and alterations within the scope and spirit of the inventive concept.

We claim:

1. In a cellular phone system having a plurality of cell units, a method for monitoring communication quality between a first cell unit and a second cell unit, the method comprising the steps of:

listening to a transmission of the first cell unit using the second cell unit;

measuring the signal quality of the transmission from the first cell unit received by the second cell unit;

recording the signal quality received by the second cell unit in a baseline memory;

re-measuring the signal quality of the transmission from the first cell unit received by the second cell unit;

recording the re-measured signal quality in a current performance memory; and comparing the contents of the current performance memory to the baseline memory to measure performance changes of the first cell unit.

2. The method of claim 1 further comprising the steps of:

listening to a transmission of the second cell unit using the first cell unit;

measuring the signal quality received by the first cell unit;

recording the signal quality received by the first cell unit in the baseline memory;

re-measuring the signal quality received by the first cell unit;

recording the re-measured signal quality in the current performance memory; and comparing the contents of the current performance memory to the baseline memory to measure performance changes of the second cell unit.

3. The method of claim 1 further comprising the steps of signaling an alarm when the comparison step indicates a performance change greater than a preselected threshold.

4. The method of claim 1 wherein the measurement step is performed during installation of the cellular system and the re-measurement step is performed periodically during normal operation of the cellular system.

5. The method of claim 1 wherein the measurement step is performed during installation of the cellular system and the re-measurement step is initiated by a system operator in response to complaints of poor service by users of the cellular system.

6. The method of claim 1 wherein the cellular system uses a time division duplex (TDD) format and the listening step includes a step of causing the second cell unit to not transmit during a selected portion of a TDD frame allocated for transmission by the second cell unit and allowing the second cell unit to receive a transmission from the first cell unit during the selected portion of the TDD frame.

7. A cellular phone system comprising:

a plurality of cell units positioned so that signals transmitted by a first cell unit can be received by a second cell unit;

a receiver in the second cell unit for causing the second cell unit to receive transmissions from the first cell unit;

measurement apparatus in the second cell unit for measuring communication quality of the transmission received from the first cell unit, wherein the measurement includes a baseline measurement and a current performance measurement;

baseline memory for storing the baseline measurement;

current performance memory for storing the current performance measurement;

a comparator coupled to the current performance memory and to the baseline memory to signal an alarm if the current performance memory differs from the baseline memory by more than a preselected amount.

8. The system of claim 7 wherein the second cell unit further comprises:

an RF receiver that is capable of receiving transmissions from each of the plurality of cell units;

signal strength measurement apparatus coupled to the RF receiver, wherein a subset of the plurality of cell units including the first cell unit are identified as having a signal strength greater than a predetermined threshold.

9. The system of claim 8 wherein the baseline memory and the current performance memory comprises entries for each of the plurality of cell units and each entry comprises a list of the adjacent cell units for a particular one of the plurality of cell units.

10. The system of claim 7 wherein the plurality of cell units use time division duplex format.

11. The system of claim 7 further comprising:
a master control unit coupled to each of the plurality of cell units, the master control unit programmed to cause the second cell unit to receive the transmissions from the first cell unit.

12. The system of claim 11 wherein each of the plurality of cell units comprise a receiver that can be individually programmed to receive transmissions from the other cell units upon command from the master control unit.

13. In a cellular phone system having a plurality of cell units and a master controller for controlling operation of the plurality of cell units, a method for monitoring communication quality comprising the steps of:
storing baseline data reflecting communication quality for each of the plurality of cell units;
selecting each cell unit in turn one at a time;
using the selected cell unit to listen for signals from other cell units;
measuring the communication quality of the other cell units using the selected cell unit;
recording the measured communication quality for each of the other cell units, wherein the recorded measurement is associated with an identification of the cell unit that was measured;
sending the recorded information to the master controller for storage;
comparing the recorded information to the baseline data; and
signaling an alarm when the comparison step indicates a significant change between the recorded information and the baseline data.

14. The method of claim 13 wherein the baseline data is gathered by:
selecting each cell unit in turn one at a time;
using the selected cell unit to listen for signals from other cell units;
measuring the communication quality of the other cell units using the selected cell unit;
recording the measured communication quality for each of the other cell units, wherein the recorded measurement is associated with an identification of the cell unit that was measured;
sending the recorded information to the master controller for storage in a baseline memory.

15. The method of claim 13 wherein the step of measuring the communication quality further comprises:
counting the number of times that the selected cell unit achieves word synchronization when listening to the other cell units.

16. The method of claim 13 wherein the step of measuring the communication quality further comprises:
counting the number of times that the selected cell unit receives an error free data packet when listening to the other cell units.

17. The method of claim 13 wherein the steps of selecting, listening, recording, and comparing are performed automatically by instruction from the master control unit to the cell units.

18. The method of claim 13 further comprising the step of:
responding to the alarm signal by analyzing the stored communication quality and the baseline data to isolate which, if any, of the plurality of cell units has degraded performance.

19. A method of controlling a cellular phone system comprising the steps of:
installing the cellular phone system having n cell units;
sequentially selecting each of the n cell units
placing the selected cell unit in a listen verification mode for a first time, wherein the listen verification mode causes the selected cell unit to generate communication quality data;
recording the communication quality data for each of the n-cell units in a baseline performance memory;
operating the cellular system without any cell units in a listen verification mode;
sequentially selecting each of the n cell units;
determining if any calls ongoing on the selected cell unit can be interrupted;
placing the selected cell unit in a listen verification mode for a second time;
recording the communication quality data for each of the n cell units in a current performance memory;
comparing the baseline performance memory with the current performance memory; and
generating an alarm signal if the comparison indicates a change greater than a predefined threshold value.

* * * * *